United States Patent
Singh et al.

(10) Patent No.: US 12,213,104 B1
(45) Date of Patent: Jan. 28, 2025

(54) SELECTING DATA THROUGHPUT USING WAVEFORM SWITCHING

(71) Applicant: T-Mobile USA, Inc., Bellevue, WA (US)

(72) Inventors: Jasinder Singh, Olathe, KS (US); Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 77 days.

(21) Appl. No.: 17/305,533

(22) Filed: Jul. 9, 2021

(51) Int. Cl.
*H04W 72/02* (2009.01)
*H04L 27/26* (2006.01)
*H04W 72/0453* (2023.01)
*H04W 72/51* (2023.01)
*H04W 72/542* (2023.01)

(52) U.S. Cl.
CPC ......... *H04W 72/02* (2013.01); *H04L 27/2607* (2013.01); *H04L 27/2636* (2013.01); *H04W 72/0453* (2013.01); *H04W 72/51* (2023.01); *H04W 72/542* (2023.01)

(58) Field of Classification Search
None
See application file for complete search history.

(56) References Cited

U.S. PATENT DOCUMENTS

| | | | | |
|---|---|---|---|---|
| 10,523,358 | B1 * | 12/2019 | Park | H04B 7/0686 |
| 2018/0139785 | A1 * | 5/2018 | Zhang | H04W 72/0413 |
| 2019/0013894 | A1 * | 1/2019 | Bayesteh | H04W 72/0413 |
| 2019/0222399 | A1 * | 7/2019 | Huang | H04W 72/14 |
| 2019/0253298 | A1 * | 8/2019 | Moroga | H04W 8/22 |
| 2019/0260498 | A1 * | 8/2019 | Moroga | H04W 72/20 |
| 2019/0349164 | A1 * | 11/2019 | Ge | H04L 5/0007 |
| 2020/0036470 | A1 * | 1/2020 | Olesen | H04L 5/0007 |
| 2020/0100186 | A1 * | 3/2020 | Osawa | H04W 52/367 |
| 2020/0106655 | A1 * | 4/2020 | Gulati | H04W 72/0453 |
| 2020/0187202 | A1 * | 6/2020 | Nammi | H04W 76/10 |
| 2020/0187252 | A1 * | 6/2020 | Lee | H04B 17/3913 |
| 2020/0244389 | A1 * | 7/2020 | Chen | H04L 1/0009 |
| 2021/0036743 | A1 * | 2/2021 | Bai | H04L 1/0003 |
| 2021/0036817 | A1 * | 2/2021 | Bai | H04L 5/0025 |
| 2021/0105079 | A1 * | 4/2021 | Lei | H04L 27/2602 |
| 2021/0227472 | A1 * | 7/2021 | Liu | H04W 72/23 |
| 2021/0281455 | A1 * | 9/2021 | Lee | H04L 27/0008 |
| 2021/0345421 | A1 * | 11/2021 | Wang | H04W 76/27 |
| 2021/0360635 | A1 * | 11/2021 | Sahraei | H04W 72/0453 |
| 2022/0094584 | A1 * | 3/2022 | Zhang | H04L 5/0064 |
| 2022/0123856 | A1 * | 4/2022 | Levitsky | H04L 27/2646 |
| 2022/0123983 | A1 * | 4/2022 | Levitsky | H04W 74/004 |
| 2022/0132498 | A1 * | 4/2022 | Nammi | H04W 4/023 |
| 2022/0167425 | A1 * | 5/2022 | Lei | H04L 27/2646 |
| 2022/0239431 | A1 * | 7/2022 | Okamura | H04W 52/146 |
| 2022/0303044 | A1 * | 9/2022 | Sakhnini | H04L 27/2646 |

(Continued)

*Primary Examiner* — Chirag G Shah
*Assistant Examiner* — Suk Jin Kang
(74) *Attorney, Agent, or Firm* — Lee & Hayes, P.C.

(57) ABSTRACT

Techniques for dynamically switching between waveforms are discussed herein. For example, a waveform selector (e.g., at a base station) may select a waveform for the UE to utilize to change data throughput. In some examples, the base station may select a DFT-s-OFDM or a CP-OFDM for the UE to utilize such that data throughput is reduced at certain times. The base station may determine which waveform to utilize based on data received from the UE, such as location data, signal data, and/or other data.

20 Claims, 6 Drawing Sheets

(56) References Cited

U.S. PATENT DOCUMENTS

2022/0338293 A1* 10/2022 Yu ..................... H04L 27/2605
2022/0345261 A1* 10/2022 Ali ..................... H04L 5/0096
2022/0376965 A1* 11/2022 Ramirez-Gutierrez .....................
  H04W 72/23

* cited by examiner

500

```
┌─────────────────────────────────────────────────────────┐
│ RECEIVE FIRST UPLINK DATA SENT FROM THE UE IN ACCORDANCE│
│                 WITH THE UPLINK WAVEFORM                │
│                           502                           │
└─────────────────────────────────────────────────────────┘
                            │
                            ▼
┌─────────────────────────────────────────────────────────┐
│ DETERMINE TO CHANGE DATA THROUGHPUT ASSOCIATED WITH A UE│
│            THAT IS CONNECTED TO A BASE STATION          │
│                           504                           │
└─────────────────────────────────────────────────────────┘
                            │
                            ▼
┌─────────────────────────────────────────────────────────┐
│   SELECT A WAVEFORM TO BE USED BY THE UE TO CHANGE THE  │
│                      DATA THROUGHPUT                    │
│                           506                           │
└─────────────────────────────────────────────────────────┘
                            │
                            ▼
┌─────────────────────────────────────────────────────────┐
│      SEND AN INDICATION OF THE UPLINK WAVEFORM TO THE UE│
│                           508                           │
└─────────────────────────────────────────────────────────┘
                            │
                            ▼
┌─────────────────────────────────────────────────────────┐
│RECEIVE SECOND UPLINK DATA SENT FROM THE UE IN ACCORDANCE│
│                 WITH THE UPLINK WAVEFORM                │
│                           510                           │
└─────────────────────────────────────────────────────────┘
```

FIG. 5

SELECTING DATA THROUGHPUT USING WAVEFORM SWITCHING

BACKGROUND

Today, many service providers intentionally slow the available bandwidth that is available to identified users. This bandwidth throttling can be used to help regulate network traffic and minimize bandwidth congestion. For example, a service provider may limit the available bandwidth during peak user times in order to maintain a stable service. In other cases, a service provider may limit the available bandwidth based on a service plan selected by a user. For instance, a user may select a service plan that limits the available bandwidth after a certain amount of data has been downloaded and/or uploaded. For example, before a user downloads a specified amount of data (e.g., 5 gigabytes), the bandwidth available to the user is not limited. After the user downloads the specified amount of data, however, the bandwidth available to a user may be reduced. In some examples, upload bandwidth and/or download bandwidth may be limited for a user. Reducing bandwidth, however, requires service providers to consume computing resources by having to schedule packets according to different service types.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process for selecting data throughput using dynamic waveform switching.

DETAILED DESCRIPTION

Figure 1:
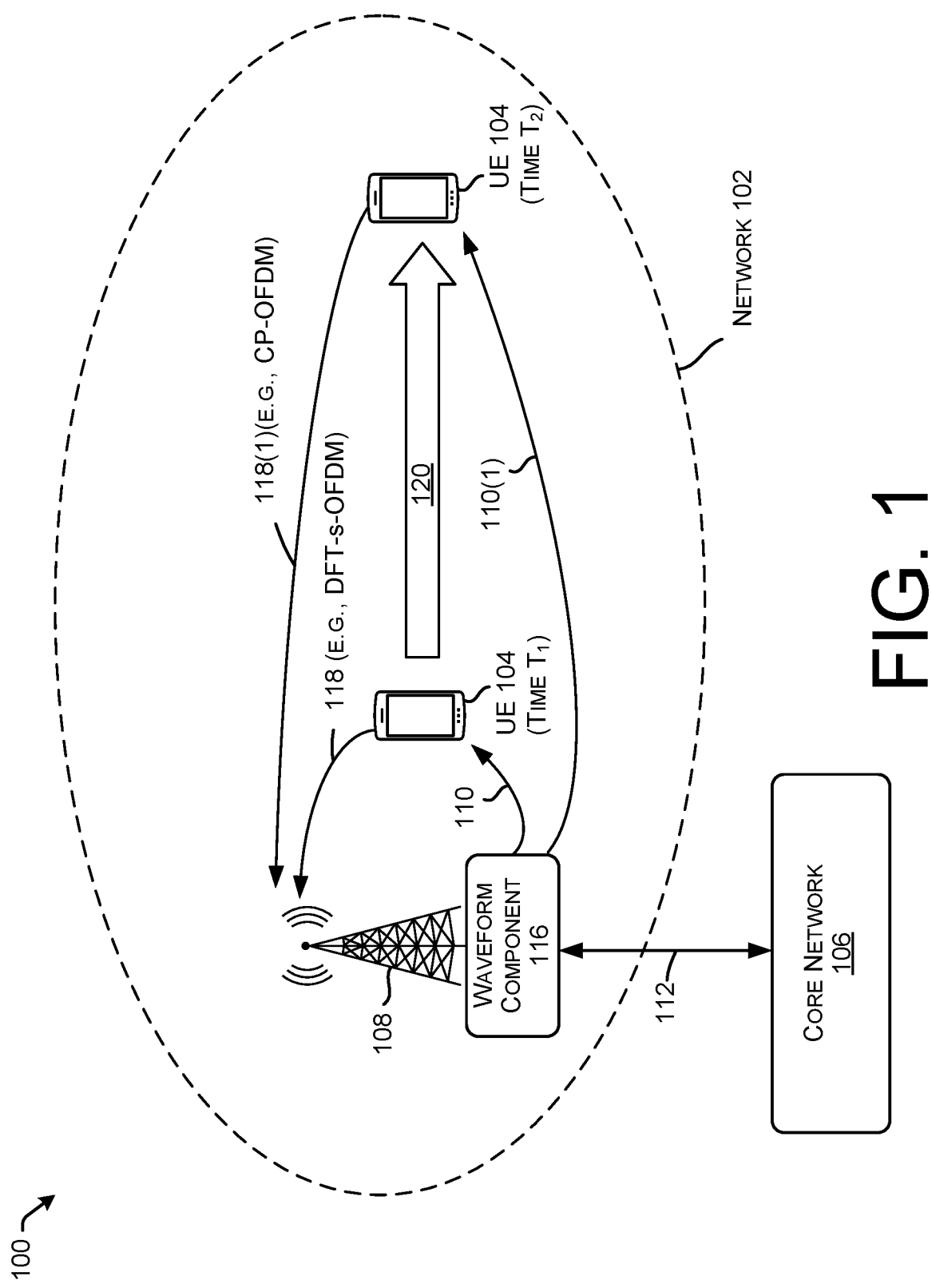
FIG. 1 shows an example network environment in which data throughput to a user equipment (UE) can be selected by performing waveform switching in a telecommunication network.

Techniques for selecting data throughput using waveform switching are discussed herein. Instead of having to consume computing resources for scheduling packets according to different service types, techniques described herein change the data throughput available to a user by selecting a waveform to assign to a user equipment (UE) (e.g., based on a quality of service associated with the of the UE).

Modern user equipment (UEs) support downlink and uplink transmission waveforms defined as Cyclic Prefix Orthogonal Frequency Division Multiplexing (CP-OFDM) waveforms and Discrete Fourier Transform Spread OFDM (DFT-s-OFDM) waveforms. Each waveform has unique characteristics. For example, DFT-s-OFDM waveforms can be considered to be a power efficient waveform that can help conserve transmission power and/or can be used to help extend cell edge coverage. CP-OFDM waveforms can be considered to be a performance waveform that can be used to maximize UE throughput in some cases.

According to some examples, a waveform selector can determine what type of signal to assign to a UE. In some configurations, the waveform selector may be part of a radio base station (BS), such as a gNB in a 5G network and/or an eNB in a 4G network. In cases when data throughput is to be reduced/limited to the UE, the waveform selector can assign a discrete Fourier transform spread (DFT-s) orthogonal frequency division multiple access (OFDM) waveform for uplink communications during a time the UE is near the cell center or near the cell center. When the UE moves to the cell edge, a base station, such as an eNB in a 4G LTE network, may assign the UE to a cyclic prefix (CP) OFDM waveform. This may result in about twenty percent less data throughput for the UE.

When data throughput is not to be reduced/limited, the waveform selector may assign the CP-OFDM waveform to the UE while the cell is near the cell center and the UE to DFT-s-OFDM waveform assigned to the UE when the UE is near cell edge. By assigning a different waveform to a UE based on a location of the UE to the cell center/cell edge, the data throughput can be reduced/increased without packet scheduling as in prior techniques.

Conventional operation selects a waveform (e.g., DFT-s-OFDM or CP-OFDM) at the start of a call session and the UE does not change the waveform throughout a communication session. By switching between waveforms, data throughput between the UE and a base station may be changed. In some examples, the waveform selector may determine which waveform to utilize based on data received from the UE (e.g., such as location data, signal data, and/or UE state data), data associated with network conditions (e.g., current/predicted congestion), and data that indicates the quality of service (QOS) to associate with the UE (e.g., service plan selected by the user of the UE).

In some cases, the waveform selector may utilize the location data and/or radio signal timing advance (TA) estimation to determine a distance between the UE and a base station. According to some examples, the waveform selector may determine if the distance is above a threshold distance and determine which waveform to utilize based on whether or not the distance is above the threshold distance. For example, the waveform selector may determine what waveform to select based on whether the UE is closer to the cell center or the cell edge.

In some examples, once the waveform selector determines the waveform to use, the waveform selector may send an indication to the UE identifying which waveform to use. For example, the UE may read and/or otherwise detect a physical downlink control channel (PDCCH) during a transmission time interval (TTI). Once a waveform is determined, the waveform selector may use a bit(s) in a particular resource element (RE) of the PDCCH frame to configure the UE to select a determined waveform. In some examples, the base station can send an indication to a UE to change an uplink waveform in connection with a radio resource control (RRC) reconfiguration message. According to some configurations, the waveform selector may periodically receive data from the UE and provide the UE with dynamic waveform selection by determining which waveform the UE should utilize and sending an indication of the waveform type via the PDCCH.

In some examples, the techniques discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc. Example implementations are provided below with reference to the following figures.

FIG. 1 shows an example network environment 100 in which data throughput to a user equipment (UE) 104 can be selected by performing waveform switching in a telecommunication network. A UE 104 can connect to a base station 108 in a telecommunication network to engage in communication sessions for voice calls, video calls, messaging, data transfers, and/or any other type of communication.

The user equipment (UE) 104 may be an electronic device such as a smart phone, a personal digital assistant, a netbook, a laptop computer, and/or another electronic device that is capable of sending and/or receiving voice or data via a telecommunication network and/or a Wi-Fi network. For example, the UE 104 can be integrated into a vehicle, a drone, a plane, a bicycle, a mobile device, and the like. In some instances, the UE 104 can be configured to send and receive data using any wired or wireless protocols.

The telecommunication network can have one or more access networks 102 that include base stations 108 and/or other access points, as well as a core network 106 linked to the access network 102. The access network 102 and/or the core network 106 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 104 can wirelessly connect to one or more base stations 108 or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network.

As illustrated, an access network 102 can include a base station (BS) 108 that communicates with the UE 104 and the core network 106, as well as other UEs 104 and other base stations 108 not illustrated in FIG. 1. In some cases, the base station 108 may be associated with an LTE access network known as an Evolved UMTS Terrestrial Radio Access Network (E-UTRAN) and/or a 5G access network. A base station 108 may handle traffic and signals between electronic devices, such as the UE 104 and other computing devices (not shown), and a core network 106. For example, the base station 108 may perform the transcoding of speech channels, allocation of radio channels to electronic devices, paging, transmission and reception of voice and data, as well as other functions.

The base station 108 may include several base transceiver stations (BTS). A BTS may include a transceiver, antenna, and additional network switch and control equipment that provide a network cell for facilitating wireless communication between computing devices and the core network of the network 102. In some instances, the base station 108 may include an eNodeB and/or a gNodeB.

The base station 108 can be connected to the core network 106. For example, the base station 108 may be connected to the core network 106 via S1 interfaces, or other interfaces, for transmission of user plane data and/or control plane data (not shown). The base station 108 may also be connected to other base stations over an X2 interface, or other interface, for transmission of user plane data and/or control plane data.

In some examples, a waveform component 116 (e.g., within the base station 108, or at some other location) may determine a waveform (e.g., DFT-s-OFDM or CP-OFDM) for the UE 104 to use. In some cases, the base station 108 may determine which waveform for the UE 104 to use based on additional information, such as a congestion level associated with the base station 108. According to some configurations, the base station 108 can estimate or otherwise determine a location associated with the UE in the environment based at least in part on radio signal timing advance (TA) data. In some examples, the base station 108 can determine an amount of time associated with a signal propagating from the base station 108 to the UE 104. The base station 108 can receive timing advance data over time to estimate a position in the environment. In some examples, the base station 108 can receive timing advance data from other base stations in the environment to triangulate or otherwise determine a location of the UE in the environment.

In the example illustrated, UE 104 is associated with a first time $T_1$ (or a first state) and the UE 104 is associated with a second time $T_2$ (or a second state). The change in time or state is represented as an arrow 120 (also referred to as a change of state 120). In some examples, the change of state 120 can represent a movement of the UE 104 in the environment. For example, the UE 104 moves from the cell center at time $T_1$ to a cell edge at time $T_2$.

The UE 104 can send uplink data 118 to the base station 108. In some examples, the uplink data 118 can be associated with a DFT-s-OFDM waveform at cell center when data is to be reduced for the UE 104. In some examples, the uplink data 118 can be based on waveform data 110 received from the waveform component 116. At time $T_2$, the waveform component 116 may use waveform data 110(1) that causes UE 104 to switch to a different waveform, such as CP-OFDM. In other examples, different waveforms may be used to select the data throughput for the UE 104.

Figure 2:
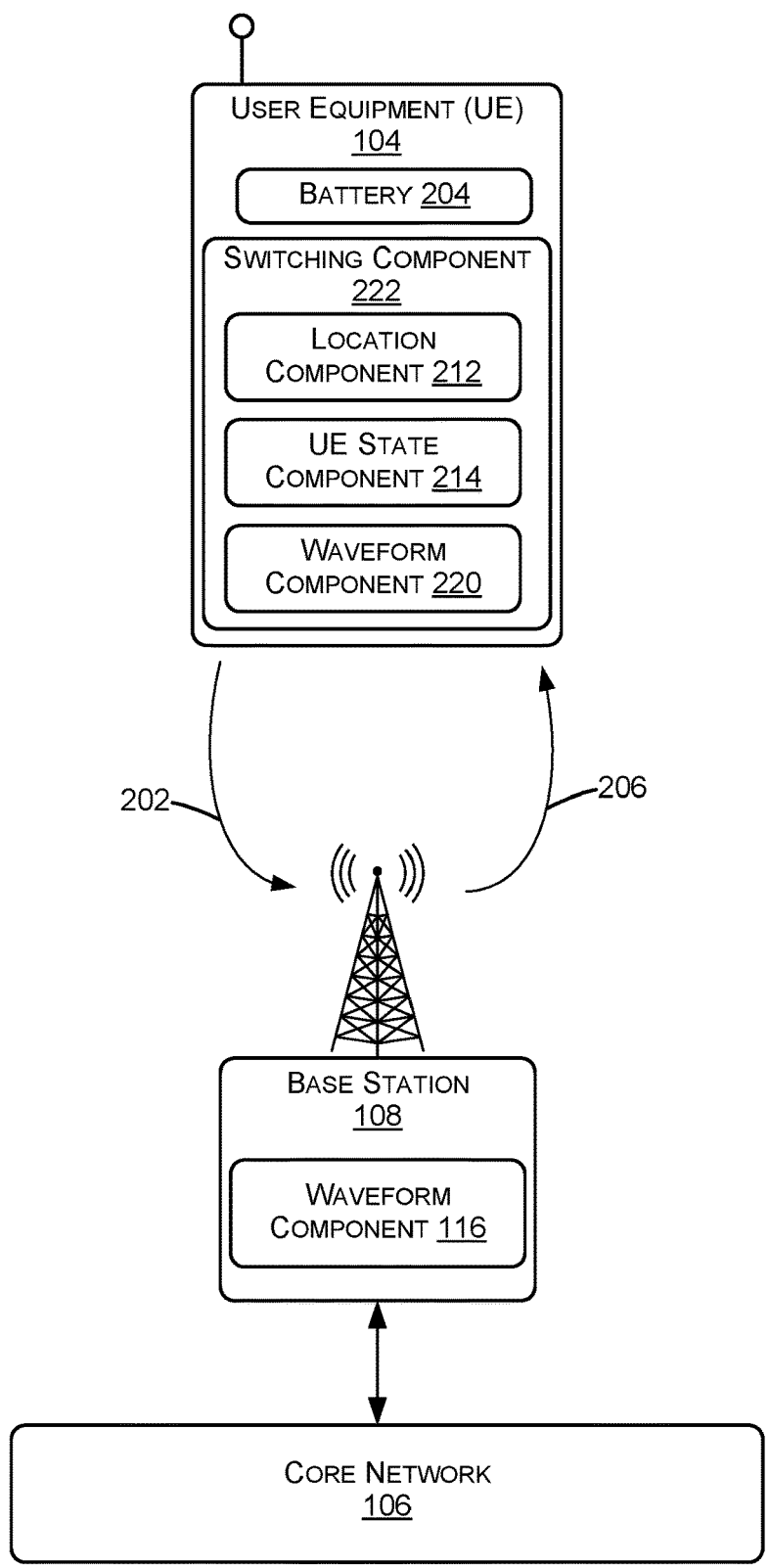
FIG. 2 shows an example network environment in which data can be provided by a UE to a waveform switching component to select data throughput.

FIG. 2 shows an example network environment 200 in which data can be provided by a UE 104 to a waveform switching component to select data throughput. FIG. 2 is similar to FIG. 1 but includes a switching component 222 to assist in determining when to switch waveforms.

As illustrated, the UE 104 can include a battery 204 that stores energy used to power the functions of the UE 104. The battery 204 can be a lithium-ion (Li-ion) battery, a lithium-ion polymer (LiPo) battery, a nickel cadmium (NiCad) battery, a nickel-metal hydride (NiMH) battery, or other type of battery. In some examples, the battery 204 can be rechargeable. For instance, the energy level of the battery 204 can increase when the UE 104 is connected to a wall outlet, a portable charger, or another external power source. However, operations of the UE 104 can also use energy and thus drain the battery 204 when the battery 204 is not charging.

In some examples, the base station 108 may receive data 202 from the UE 104 that includes information associated with the UE 104. The information associated with the UE 104 may include location data determined by a location component 212 of the UE 104, signal data (e.g., transmission power headroom data associated with the UE 104, uplink signal-to-interference-plus-noise ratio (SINR) data as determined by the base station 108, uplink path loss data determined by the base station 108, etc.), UE state data determined by a UE state component 214 of the UE 104 (an indication that the UE 104 is associated with a low power mode, an amount of power in the battery 204 associated with the UE 104, a charge state indication associated with the UE 104, etc.), etc.

In some cases, the base station 108 may utilize the location data included in the data 202 (and/or timing advance data) to determine a distance between the UE 104 and the base station 108. In some examples, the base station 108 may determine if the distance is above a threshold distance and determine which waveform to utilize based on whether or not the distance is above the threshold distance. For example, when data throughput is to be regulated to the UE 104, the waveform component 116 may determine for the UE 104 to use the DFT-s-OFDM waveform when the UE 104 is determined to be near the cell center and to use the CP-OFDM waveform when the UE 104 is determined to be closer to the edge of the cellular network.

In some configurations, the waveform component 116 can receive data about the UE, radio frequency conditions, network condition, and the like, and can input the data into a machine learning mechanism to determine a waveform for the UE 104 to use to regulate the data throughput.

In some examples, once the waveform component 116 of the base station 108 determines the waveform for the UE 104 to use, the base station 108 may send an indication 206 to the UE 104 identifying which waveform to use. For example, the UE 104 may read and/or otherwise detect a physical downlink control channel (PDCCH) every transmission time interval (TTI). Once a waveform is determined, the base station 108 may use (e.g., toggle) a bit(s) in a particular resource element (RE) of the PDCCH frame during blind detection to configure the UE 104 to operate using the determined waveform via a waveform component 116. According to some examples, the base station 108 may continually receive data 202 from the UE 104 and provide the UE 104 with dynamic waveform selection by determining which waveform the UE 104 should use and sending an indication of the waveform type via the PDCCH.

Dynamically changing which waveform (e.g., DFT-s-OFDM or CP-OFDM) the UE 104 operates with during transmissions enables the UE 104 to operate according to the selected throughput for the conditions of the UE 104, the base station 108, and/or the core network 106, which can change after a communication session has been established.

Figure 3:
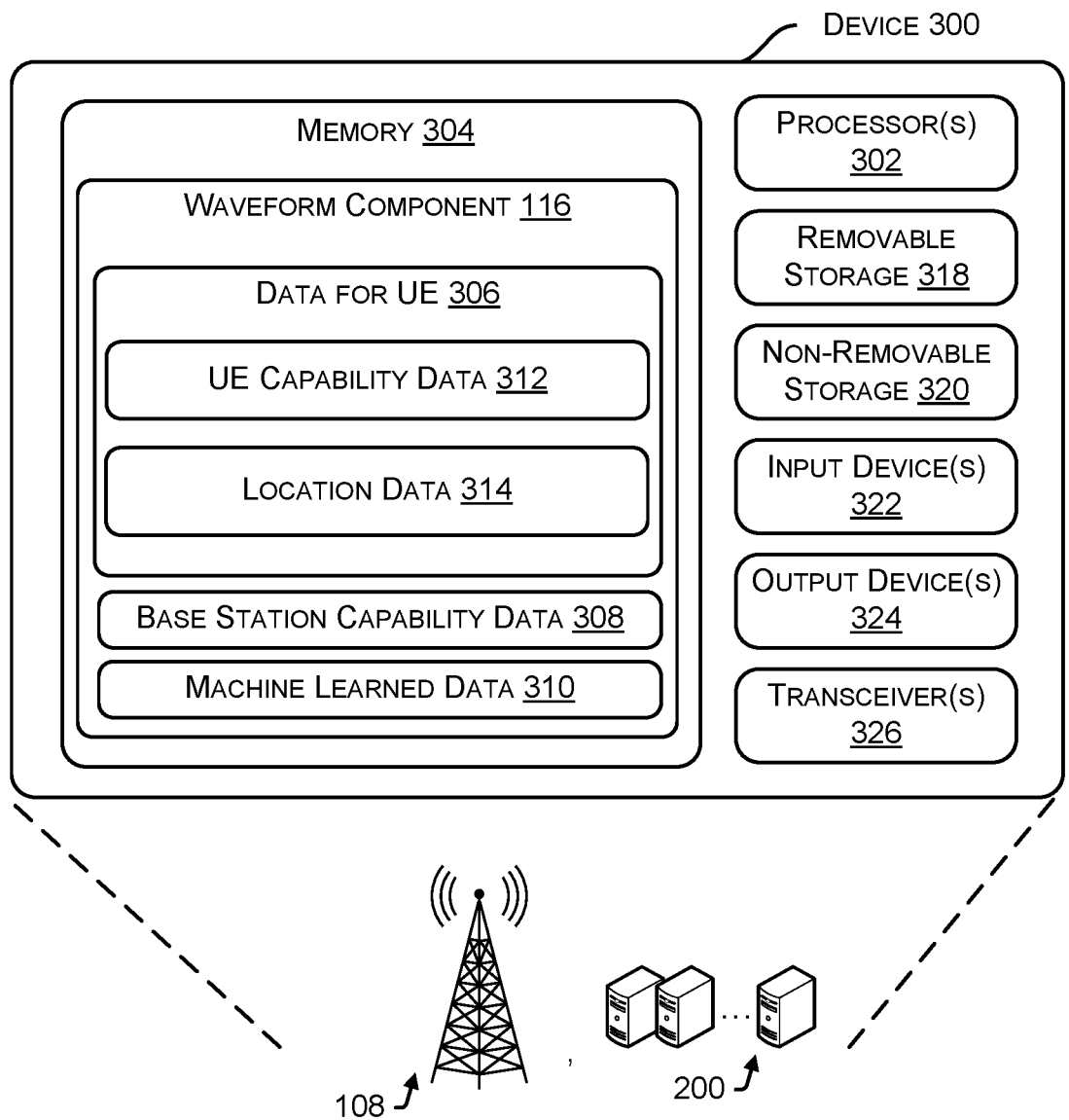
FIG. 3 is a block diagram of a device including a waveform switching component.

FIG. 3 shows basic, high-level components of the device 300. Generally, the device 300 may comprise and/or may be implemented in any of various network components discussed herein, including those components illustrated in FIG. 1 and FIG. 2. For example, the device 300 may be implemented in the base station 108, which may include an eNB, a gNB, the core network 106, or other network device.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the waveform component 116, which may include data for UE 306, base station capability data 308, UE capability data 312, location data 314, and/or machine learned data 310.

In some examples, the waveform component 116 can include functionality to determine which waveform (e.g., DFT-s-OFDM or CP-OFDM) a UE, such as the UE 104 should during communications (e.g., uplink and/or downlink) based on conditions associated with the UE. The waveform component 116 can use the data illustrated in FIG. 3 to receive information from the UE 104, determine which waveform to select based on the information, and send an indication to the UE 104 as to which waveform the UE 104 should use. For example, the waveform component 116 can determine which waveform to use based at least in part on the data for UE 306, the base station capability data 308, the UE capability data 312, the location data 314, and/or the machine learned data 310.

In some examples, the data for UE 306 can include data received by a UE, such as the UE 104, in an uplink transmission and may include information associated with the UE, such as UE capability data 312, and location data 314. The UE 306 may utilize the data for UE 306 in combination with the base station capability data 308 and the machine learned data 310 in order to determine which waveform the UE should use.

In some examples, the base station capability data 308 can be based at least in part on signal data associated with a connection between the device 300 (e.g., a connection associate with the data 202 and/or the indication 206) and a UE (e.g., the UE 104). For example, the base station capability data 308 can be based at least in part on signal data comprising one or more of Channel Quality Information (CQI) data, signal-to-noise ratio (SNR) data, signal-to-interference plus noise ratio (SINR) data, and/or signal-to-noise plus distortion ratio (SNDR) data.

The capability data 308 can also be based at least in part on an amount of traffic and/or congestion at the device 300 or associated with an LTE and/or NR connection. For example, as a number of devices and/or connections between the device 300 and other UEs increases, an amount of resources to be allocated to a UE 104 may decrease. In some examples, an amount of resources may be based at least in part on subscriber level, device type, location, and the like. Accordingly, the capability data 308 can be based on a number of factors or data.

In some examples, the UE capability data 312 can include an indication of whether the UE supports an EN-DC connection, an LTE connection, and/or an NR connection. In some examples, the UE capability data 312 can include an indication of particular frequency bands that the UE supports so that the waveform component 116 can determine which waveform to use. In some examples, the UE capability data 312 can indicate various modulation schemes supported by the UE, which may factor into the base station capability data 308, as discussed above.

In some examples, the location data 314 can include a location of the UE. For example, the location data 314 can be based on GPS data, base station triangulation data, and the like. In some examples, the location data 314 can include velocity data and heading data, which may be indicative of the UE being at one location for a period of time or on the move (e.g., in a vehicle). In some cases, the waveform component 116 may utilize the location data 314 to determine a distance between the UE and the device 300. In some examples, the waveform component 116 may determine if the distance is above a threshold distance and determine which waveform to utilize based on whether or not the distance is above the threshold distance. For example, the waveform component 116 may determine for the UE to utilize DFT-s-OFDM (for UEs which do not have reduced data throughput) and CP-OFDM (for UEs to reduce data throughput) when the UE is closer to an edge of a cellular network (e.g., further from the device 200) and determine for the UE 104 to utilize CP-OFDM when the UE (for UEs which do not have reduced data throughput) and DFT-s-OFDM (for UEs to reduce data throughput) is closer to the center cellular network (e.g., closer to the device 300).

In some examples, the machine learned data 310 can include one or more machine learned models or heuristics that can be used to determine which waveform select for the UE to use. For example, the machine learned data 310 can include weight(s) for various factors that can be used to set threshold(s) or likelihoods and/or determine factors that increase or decrease threshold(s) or likelihoods, and by how much.

In some instances, the machine learned model can determine a similarity score between UE state data (e.g., power condition(s), 4G/5G capability, carrier aggregation capability, location data, timing advance data, etc.), radio frequency conditions (e.g., transmission power headroom data associated with the UE 104, uplink signal-to-interference-plus-noise ratio (SINR) data as determined by the base station 108, uplink path loss data determined by the base station 108, etc.), network conditions (e.g., load levels, congestions, radio access technologies (e.g., 4G/5G), and the like and ground truth conditions representing various conditions and outcomes. Based on a similarity score of input data associated with positive outcomes (e.g., instructing the UE to use a waveform resulting in a good quality of service, reduced or optimal power consumption, etc.) or negative outcomes, the machine learned model can instruct the UE to use a particular waveform.

In some examples, the machine learned data 310 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. The memory 304, the removable storage 318 and the non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 318, and/or the non-removable storage 320 may in some cases include storage media used to transfer or distribute instructions, applications, and/or data. In some cases, the memory 304, the removable storage 318, and/or the non-removable storage 320 may include data storage that is accessed remotely, such as network-attached storage that the device 300 accesses over some type of data communications network.

In various examples, any or all of the memory 304, the removable storage 318, and/or the non-removable storage 320 may store programming instructions that, when executed, implement some or all of the function functionality described herein.

The device 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the device 300 also includes one or more wired or wireless transceiver(s) 326. For example, the transceiver(s) 326 can include a network interface card (NIC), a network adapter, a LAN adapter, or a physical, virtual, or logical address to connect to various networks, devices, or components illustrated in figures herein. To increase throughput when exchanging wireless data, the transceiver(s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMAX, Bluetooth, infrared communication, and the like. In some examples, the device 300 can be implemented as the UE 104 including the battery 204 and/or the switching component 222.

Figure 4:
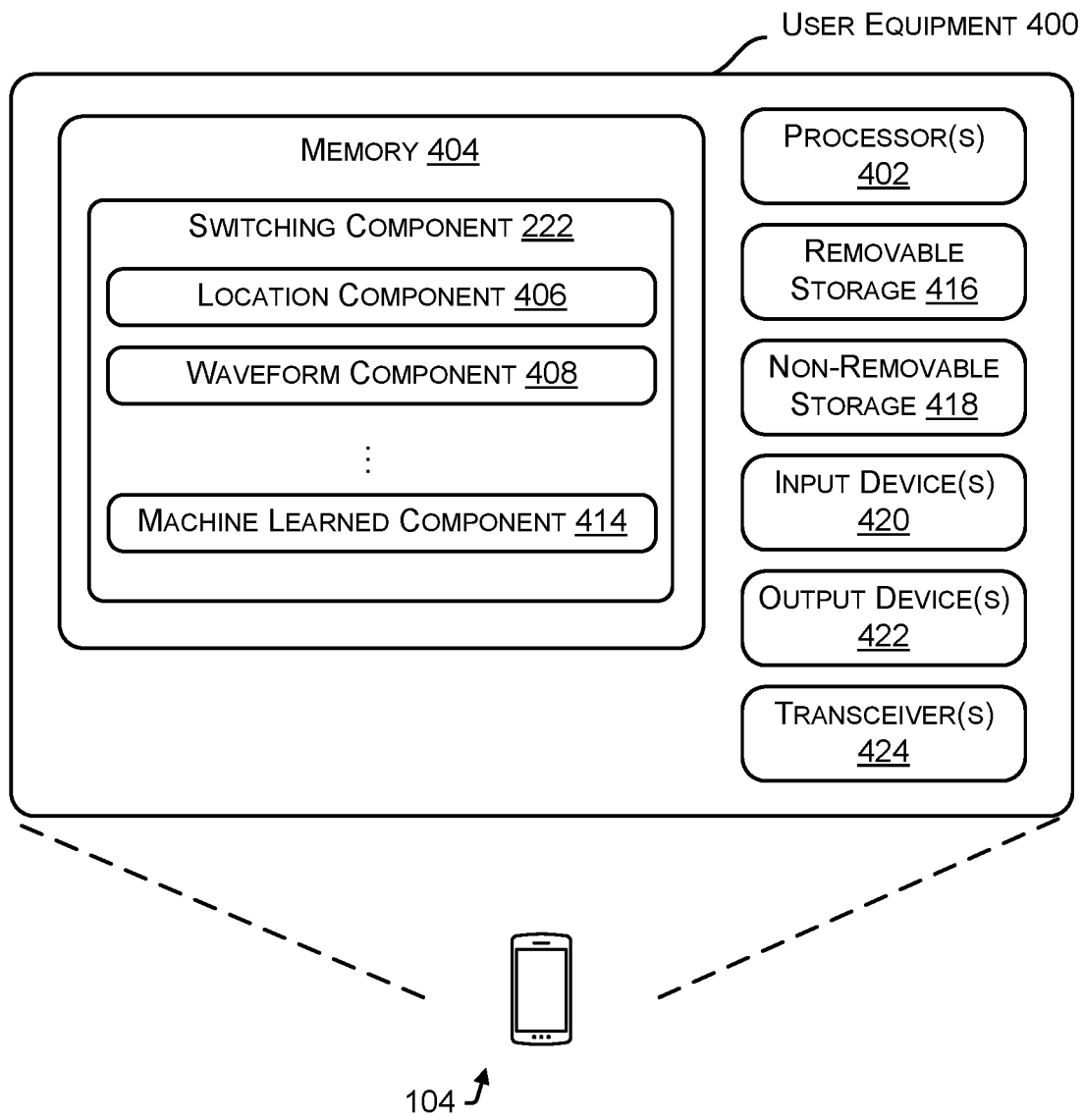
FIG. 4 a block diagram of a device including a waveform switching component.

FIG. 4 is a block diagram of a UE 400 including components for determining attributes for use in selecting a waveform to use. In some examples, the UE 400 (also referred to as a device 400) can be configured to implement some or all of the techniques discussed herein. Generally, the device 400 may comprise and/or may be implemented in any of various network components discussed herein, including those components illustrated in FIG. 1 and FIG. 2.

In various examples, the device 400 may include processor(s) 402 and memory 404. Depending on the exact configuration and type of computing device, the memory 404 may be volatile (such as RAM), non-volatile (such as ROM, flash memory, etc.) or some combination of the two. The memory 404 may include the switching component 222, which may include a location component 406, a waveform component 408, and a machine learned component 410.

In some examples, the switching component 222 can include functionality to gather or otherwise determine data about the UE and to report the data to another computing device (e.g., the base station 108) or to report a determined priority level associated with the one or more data.

In further examples, the switching component 222 can determine and report a user ID (identifier) that can indicate or correspond to a customer or user profile, such as an individual or organization using the device 400 or to whom the device 400 belongs. As another example, a user ID may indicate or correspond to a particular customer account with which the device 400 is associated. As yet another example, a user ID may indicate or correspond to a provider of services with which a data packet is associated.

In some examples, the location component 406 may be used to determine location data (e.g., a location) associated with the UE 400 and provide the location data to a computing device, such as the base station 108.

According to some configurations, the waveform component 408 may be used to determine waveform data associated with the UE 400 and provide the waveform data to a computing device, such as the base station 108. The waveform data may include data indicating which waveform is currently being used and/or which waveforms have previously been used. In some cases, the waveform component 408 may cause the UE 300 to switch waveforms, such as to a DFT-s-OFDM or CP-OFDM. For example, the UE 400 may access a bit in a particular resource element (RE) of a PDCCH frame during a TTI to determine which waveform should be used. In some examples, the bit may be toggled to a "1" or a "0" that indicates which waveform the UE 400 should utilize. The "1" may be associated with a DFT-s-OFDM while the "0" may be associated with CP-OFDM, or vice versa.

In some examples, the machine learned component 414 can include one or more machine learned models or heuristics that can be used to determine a priority level of downlink data associated with a data request. For example, the machine learned component 414 can include weight(s) for various factors that can be used to set priority level(s) or likelihoods and/or determine factors that increase or decrease a priority level, and by how much.

In some examples, the processor(s) 402 is a central processing unit (CPU), a graphics processing unit (GPU), both CPU and GPU, or other processing unit or component known in the art. Furthermore, the processor(s) 402 may include any number of processors and/or processing cores. The processor(s) 402 is configured to retrieve and execute instructions from the memory 404.

The memory 404 can also be described as non-transitory computer-readable media or machine-readable storage memory and may include removable and non-removable media implemented in any method or technology for storage of information, such as computer executable instructions, data structures, program modules, or other data.

The memory 404 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 400 also includes additional data storage devices (removable and/or non-removable) such as, for example, magnetic disks, optical disks, or tape. Such additional storage is illustrated in FIG. 4 by removable storage 416 and non-removable storage 418. Tangible computer-readable media can include volatile and non-volatile, removable and non-removable media implemented in any method or technology for storage of information, such as computer readable instructions, data structures, program modules, or other data. The memory 404, the removable storage 416 and the non-removable storage 418 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 400. Any such tangible computer-readable media can be part of the device 400.

The memory 404, the removable storage 416, and/or the non-removable storage 418 may in some cases include storage media used to transfer or distribute instructions, applications, and/or data. In some cases, the memory 404, the removable storage 416, and/or the non-removable storage 418 may include data storage that is accessed remotely, such as network-attached storage that the device 400 accesses over some type of data communications network.

In various examples, any or all of the memory 404, the removable storage 416, and/or the non-removable storage 418 may store programming instructions that, when executed, implement some or all of the function functionality described herein.

The device 400 also can include input device(s) 420, such as a keypad, a cursor control, a touch-sensitive display, voice input device, etc., and output device(s) 422 such as a display, speakers, printers, etc. These devices are well known in the art and need not be discussed at length here.

As illustrated in FIG. 4, the device 400 also includes one or more wired or wireless transceiver(s) 424. For example, the transceiver(s) 424 can include a network interface card (NIC), a network adapter, a LAN adapter, or a physical, virtual, or logical address to connect to various networks, devices, or components illustrated in figures herein. To increase throughput when exchanging wireless data, the transceiver(s) 424 can utilize multiple-input/multiple-output (MIMO) technology. The transceiver(s) 424 can comprise any sort of wireless transceivers capable of engaging in wireless, radio frequency (RF) communication. The transceiver(s) 424 can also include other wireless modems, such as a modem for engaging in Wi-Fi, WiMAX, Bluetooth, infrared communication, and the like.

Figure 6:
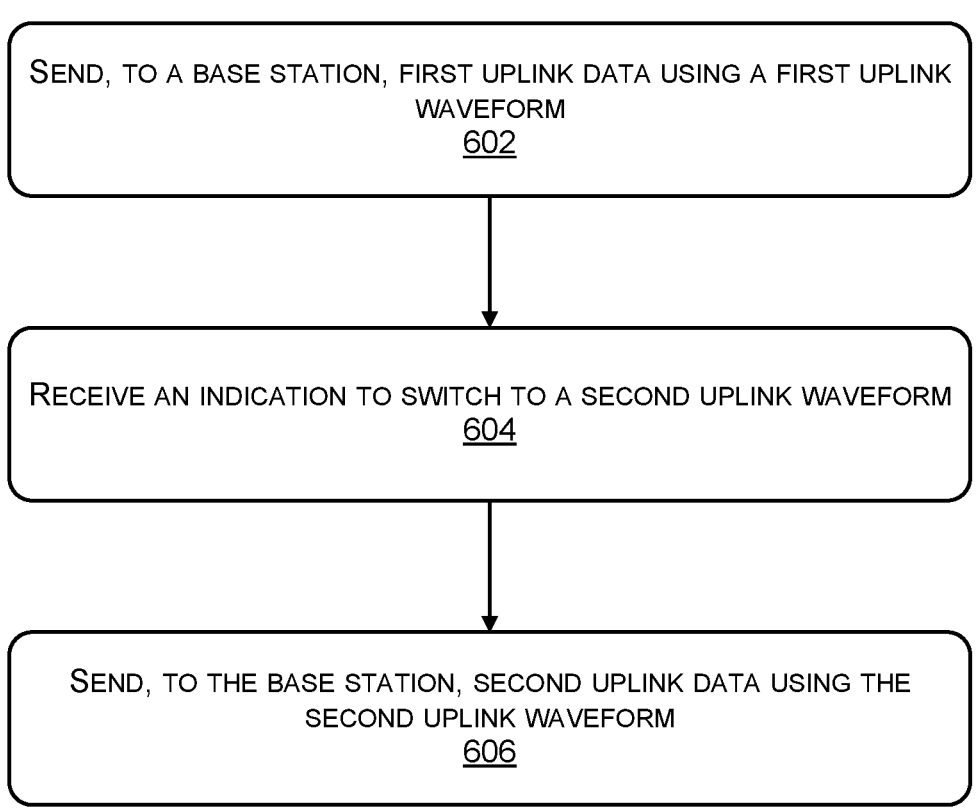
FIG. 6 illustrates an example process for a UE switching waveforms.

FIGS. 5-6 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 illustrates an example process 500 for selecting data throughput using dynamic waveform switching. At 502, the base station 108 can receive first data from the UE 104. For example, the base station 108 may receive uplink data that may include information associated with the UE 104, such as location data determined by a location component of the UE 104, signal data (e.g., transmission power headroom data associated with the UE 104, uplink signal-to-interference-plus-noise ratio (SINR) data as determined by the base station 108, uplink path loss data determined by the base station 108, etc.), UE state data determined by a UE state component of the UE 104 (an indication that the UE 104 is associated with a low power mode, an amount of power in the battery 204 associated with the UE 104, a charge state indication associated with the UE 104, etc.), etc.

At 504, a determination may be made to change the data throughput associated with the UE that is connected to base station 108. As discussed above, the determination can be based on the QoS associated with the UE 104, the amount of data used by the UE 104, congestion data, and the like.

At 506, the base station 108 may analyze the uplink data and determine a waveform based on the uplink data. For example, base station 108 may determine a waveform (e.g., DFT-s-OFDM or CP-OFDM) via a waveform component for the UE 104 to utilize in further uplink transmissions based on the uplink data received from the UE 104. In some cases, the base station 108, or some other component or device, may determine which waveform for the UE 104 to utilize based on additional information, such as a traffic type associate with a UE uplink queue (e.g., bursty traffic sent using CP-OFDM).

In some cases, the base station 108 may utilize location data to determine a distance between the UE 104 and the base station 108. In some examples, the base station 108 may determine if the distance is above a threshold distance and determine which waveform to utilize based on whether or not the distance is above the threshold distance. For example, the base station 108 may determine for the UE 104 to utilize CP-OFDM when the UE 104 is closer to an edge of a cellular network and determine for the UE 104 to utilize DFT-s-OFDM when the UE 104 is closer to the center of cellular network.

In some cases, the base station 108 may determine which waveform to utilize based on a type of base station that the UE 104 will be communicating the subsequent uplink transmission with. For example, the UE 104 can connect to one base station using a Fifth Generation (5G) New Radio (NR) connection and also connect to another base station using a Fourth Generation (4G) Long-Term Evolution (LTE) connection.

At 508, the base station 108 may send waveform data to the UE 104 indicating which waveform the UE 104 should utilize when communicating via an uplink transmission. For example, once the base station 108 determines the waveform for the UE 104 to utilize in uplink transmissions, the base station 108 may toggle a bit in a particular resource element (RE) of a PDCCH frame to indicate which waveform should be used so that when the UE 104 accesses the PDCCH during a TTI, the UE 104 can determine which waveform to use based on the status of the bit At 510 the UE 104 can send additional uplink data utilizing the waveform specified by the base station 108. For example, the UE 104 may communicate with the base station 108 based on a TTI schedule and provide uplink data to the base station 108 with each communication. As conditions associated with the UE 104 and/or the base station 108 change, the uplink data may also change and the base station 108 can determine if the UE 104 should change the waveform being used for uplink transmissions in order to change the data throughput.

FIG. 6 illustrates example process 600 for a UE to dynamically switching waveforms. The example process 600 can be performed by the UE 104, and/or by another component or device as discussed herein.

At 602, the process can include sending, to a base station, first uplink data using a first uplink waveform. For example, the UE 104 may send uplink data 110 to the base station 108 that includes information associated with the UE 104. The information associated with the UE 104 may include location data determined by a location component 212 of the UE 104, signal data (e.g., transmission power headroom data associated with the UE 104, uplink signal-to-interference-plus-noise ratio (SINR) data as determined by the base station 108, uplink path loss data determined by the base station 108, etc.), UE state data determined by a UE state component 214 of the UE 104 (an indication that the UE 104 is associated with a low power mode, an amount of power in the battery 204 associated with the UE 104, a charge state indication associated with the UE 104, etc.), etc. The base station 108 may determine a waveform (e.g., DFT-s-OFDM or CP-OFDM) via a waveform component 116 for the UE 104 to utilize in further uplink transmissions based on the uplink data 110 received from the UE 104. In some cases, the base station 108 may determine which waveform for the UE 104 to utilize based on additional information, such as a traffic type associate with a UE uplink queue (e.g., bursty traffic sent using CP-OFDM).

At 604, the UE 104 can receive an indication to switch to a second uplink waveform via a Physical Downlink Control Channel (PDCCH). For example, once the waveform component 116 of the base station 108 determines the waveform for the UE 104 to utilize in uplink transmissions, the base station 108 may send an indication 118 to the UE 104 identifying which waveform to utilize for uplink transmissions. For example, the UE 104 may read and/or otherwise detect a physical downlink control channel (PDCCH) every transmission time interval (TTI). Once a waveform is determined, the base station 108 may send data to the UE to configure the UE 104 to operate using the determined waveform via a waveform component 116.

At operation 606, the UE 104 can send, to the base station, second uplink data using the second uplink waveform. For example, the UE 104 may continually send additional uplink data to the base station 108 and provide the base station 108 with updated uplink data as conditions associated with the UE 104 change.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   determining, by a base station within a telecommunications network, to reduce data throughput associated with a first user equipment (UE), wherein the first UE is connected to the base station and the determining is based on a first service plan associated with a first user of the first UE;
   determining, by the base station, a first location of the first UE within a cell associated with the base station;
   based on the determining to reduce data throughput and based on the first location of the first UE, selecting, by the base station, a first waveform for the first UE, wherein the selecting comprises selecting a Cyclic Prefix OFDM (CP-OFDM) waveform as the first waveform when the first UE is near the cell edge and selecting a Discrete Fourier Transform Spread Orthogonal Frequency Division Multiplexing (DFT-s-OFDM) waveform as the first waveform when the first UE is near the cell center;

causing, by the base station, the first waveform to be to be used by the first UE;
determining, by the base station, to maintain or increase throughput associated with a second UE, wherein the second UE is connected to the base station and the determining is based on a second service plan associated with a second user of the second UE;
determining, by the base station, a second location of the second UE within a cell associated with the base station;
based on the determining to maintain or increase throughput and based on the second location of the second UE, selecting, by the base station, a second waveform for the second UE, wherein the selecting comprises selecting the DFT-s-OFDM waveform as the second waveform when the second UE is near the cell edge and selecting the CP-OFDM waveform as the second waveform when the second UE is near the cell center; and
causing, by the base station, the second waveform to be to be used by the second UE.

2. The method of claim 1, wherein determining to reduce the data throughput is further based, at least in part, on a quality of service (QOS) associated with the first UE.

3. The method of claim 1, further comprising:
determining that the first location is near a cell center associated with the base station.

4. The method of claim 1, further comprising:
determining that the first location is near a cell edge associated with the base station.

5. The method of claim 1, wherein determining the first location of the first UE includes receiving first location data from the first UE that indicates the first location of the first UE.

6. The method of claim 1, further comprising sending, to the first UE, an indication of the first waveform.

7. The method of claim 1, further comprising determining at least one of a congestion level associated with the base station or a traffic type to be transmitted by the first UE, and wherein selecting the first waveform is based at least in part on the at least one of the congestion level or the traffic type.

8. A system including a base station within a telecommunications network, the system comprising:
one or more processors of the base station; and
one or more non-transitory computer-readable media storing computer-executable instructions that, when executed, cause the one or more processors to perform operations comprising:
determining to reduce data throughput associated with a first user equipment (UE), wherein the first UE is connected to the base station and the determining is based on a first service plan associated with a first user of the first UE;
determining a first location of the first UE within a cell associated with the base station;
based on the determining to reduce data throughput and based on the location of the first UE, selecting a first waveform for the first UE, wherein the selecting comprises selecting a Cyclic Prefix OFDM (CP-OFDM) waveform as the first waveform when the first UE is near the cell edge and selecting a Discrete Fourier Transform Spread Orthogonal Frequency Division Multiplexing (DFT-s-OFDM) waveform as the first waveform when the first UE is near the cell center;
causing the first waveform to be to be used by the first UE;
determining, by the base station, to maintain or increase throughput associated with a second UE, wherein the second UE is connected to the base station and the determining is based on a second service plan associated with a second user of the second UE;
determining, by the base station, a second location of the second UE within a cell associated with the base station;
based on the determining to maintain or increase throughput and based on the second location of the second UE, selecting, by the base station, a second waveform for the second UE, wherein the selecting comprises selecting the DFT-s-OFDM waveform as the second waveform when the second UE is near the cell edge and selecting the CP-OFDM waveform as the second waveform when the second UE is near the cell center; and
causing, by the base station, the second waveform to be to be used by the second UE.

9. The system of claim 8, wherein determining to reduce the data throughput is further based, at least in part, on a quality of service (QOS) associated with the first UE.

10. The system of claim 8, the operations further comprising:
determining that the first location is near a cell center associated with the base station.

11. The system of claim 8, the operations further comprising:
determining that the first location is near a cell edge associated with the base station.

12. The system of claim 8, wherein determining the first location of the first UE includes receiving first location data from first UE that indicates the first location of the first UE.

13. The system of claim 8, the operations further comprising determining at least one of a congestion level associated with the base station or a traffic type to be transmitted by the first UE, and wherein selecting the first waveform is based at least in part on the at least one of the congestion level or the traffic type.

14. The system of claim 8, wherein the base station is a Fifth-Generation (5G) base station.

15. A non-transitory computer storage medium having programming instructions stored thereon that, when executed by one or more processors of a base station within a telecommunications network, cause the base station to perform operations comprising:
determining to reduce data throughput associated with a first user equipment (UE), wherein the first UE is connected to the base station and the determining is based on a first service plan associated with a first user of the first UE;
determining a first location of the first UE within a cell associated with the base station;
based on the determining to reduce data throughput and based on the first location of the first UE, selecting a first waveform for the first UE, wherein the selecting comprises selecting a Cyclic Prefix OFDM (CP-OFDM) waveform as the first waveform when the first UE is near the cell edge and selecting a Discrete Fourier Transform Spread Orthogonal Frequency Division Multiplexing (DFT-s-OFDM) waveform as the first waveform when the first UE is near the cell center;
causing the first waveform to be to be used by the first UE;
determining to maintain or increase throughput associated with a second UE, wherein the second UE is connected to the base station and the determining is based on a second service plan associated with a second user of the second UE;
determining a second location of the second UE within a cell associated with the base station;
based on the determining to maintain or increase throughput and based on the second location of the second UE, selecting a second waveform for the second UE, wherein the selecting comprises selecting the DFT-s-OFDM waveform as the second waveform when the second UE is near the cell edge and selecting the CP-OFDM waveform as the second waveform when the second UE is near the cell center; and
causing the second waveform to be to be used by the second UE.

16. The non-transitory computer storage medium of claim 15, wherein determining to reduce the data throughput is further based, at least in part, on a quality of service (QoS) associated with the first UE.

17. The non-transitory computer storage medium of claim 15, wherein the operations further comprise:
  determining that the first location is near a cell center associated with the base station; or
  determining that the first location is near a cell edge associated with the base station.

18. The non-transitory computer storage medium of claim 15, wherein determining the first location of the first UE includes receiving first location data from the first UE that indicates the first location of the first UE.

19. The non-transitory computer storage medium of claim 15, wherein the operations further comprise sending, to the first UE, an indication of the first waveform.

20. The non-transitory computer storage medium of claim 15, wherein the operations further comprise determining at least one of a congestion level associated with the base station or a traffic type to be transmitted by the first UE, and wherein selecting the first waveform is based at least in part on the at least one of the congestion level or the traffic type.

* * * * *